US012365625B2

United States Patent
Skoptsov et al.

(10) Patent No.: US 12,365,625 B2
(45) Date of Patent: Jul. 22, 2025

(54) NANOCARBON MATERIAL AND APPLICATIONS OF NANOCARBON MATERIAL

(71) Applicant: H QUEST VANGUARD, INC., Pittsburgh, PA (US)

(72) Inventors: George L. Skoptsov, Pittsburgh, PA (US); Kurt W. Zeller, Pittsburgh, PA (US); Aayush Mantri, Pittsburgh, PA (US); Vignesh Viswanathan, Pittsburgh, PA (US)

(73) Assignee: H QUEST VANGUARD, INC., Pittsburgh, PA (US)

( * ) Notice: Subject to any disclaimer, the term of this patent is extended or adjusted under 35 U.S.C. 154(b) by 980 days.

(21) Appl. No.: 17/437,616

(22) PCT Filed: Mar. 12, 2020

(86) PCT No.: PCT/US2020/022309
§ 371 (c)(1),
(2) Date: Sep. 9, 2021

(87) PCT Pub. No.: WO2020/209975
PCT Pub. Date: Oct. 15, 2020

(65) Prior Publication Data
US 2022/0185730 A1  Jun. 16, 2022

Related U.S. Application Data

(60) Provisional application No. 62/817,317, filed on Mar. 12, 2019, provisional application No. 62/817,309, filed on Mar. 12, 2019.

(51) Int. Cl.
*C04B 20/00* (2006.01)
*C01B 32/194* (2017.01)
(Continued)

(52) U.S. Cl.
CPC ........ *C04B 20/0036* (2013.01); *C01B 32/194* (2017.08); *C01B 32/336* (2017.08);
(Continued)

(58) Field of Classification Search
None
See application file for complete search history.

(56) References Cited

U.S. PATENT DOCUMENTS 9,987,611 B1   6/2018  Strohm et al.
10,434,490 B2  10/2019  Strohm et al.
(Continued)

FOREIGN PATENT DOCUMENTS

JP    2015509474 A    *  3/2015  ............ B82Y 30/00
JP    2006124298 A1      5/2016
(Continued)

OTHER PUBLICATIONS

Machine translation of JP2015509474 (Year: 2015).*
(Continued)

*Primary Examiner* — Michael Forrest

(57) ABSTRACT

A nanocarbon material includes agglomerate nanostructures made of aggregates of: (i) graphene nanostructures having at least partially crumpled morphology, and (ii) clusters of at least one carbon material. The carbon material may have a graphitic structure. At least a portion of the graphitic structure may be at least partially hollow and have at least one winged protrusion. Optionally, the nanocarbon material may be part of a composition that includes a dispersion medium or a cementitious material. Methods of making such a composition are also disclosed.

35 Claims, 6 Drawing Sheets

(51) Int. Cl.
*C01B 32/336* (2017.01)
*C04B 28/08* (2006.01)
*C04B 103/40* (2006.01)
*C08K 7/18* (2006.01)
*C09C 1/44* (2006.01)
*C22C 14/00* (2006.01)
*C22C 32/00* (2006.01)

(52) U.S. Cl.
CPC ............ *C04B 28/08* (2013.01); *C08K 7/18* (2013.01); *C09C 1/44* (2013.01); *C22C 14/00* (2013.01); *C22C 32/0084* (2013.01); *C01B 2204/22* (2013.01); *C01B 2204/32* (2013.01); *C01P 2002/02* (2013.01); *C01P 2004/04* (2013.01); *C01P 2004/34* (2013.01); *C01P 2004/50* (2013.01); *C04B 2103/408* (2013.01)

(56) References Cited

U.S. PATENT DOCUMENTS

| | | | |
|---|---|---|---|
| 10,918,998 B2 | 2/2021 | Prince et al. | |
| 11,021,661 B2 | 6/2021 | Strohm et al. | |
| 2012/0116094 A1* | 5/2012 | Swager | C07F 5/00 562/466 |
| 2015/0315449 A1* | 11/2015 | Kim | F28F 21/081 165/185 |
| 2018/0147545 A1 | 5/2018 | Bhuvana et al. | |
| 2018/0334407 A1* | 11/2018 | Fulton | C04B 40/0046 |
| 2019/0046947 A1 | 2/2019 | Strohm et al. | |
| 2019/0047865 A1 | 2/2019 | Zeller et al. | |

FOREIGN PATENT DOCUMENTS

| | | | | |
|---|---|---|---|---|
| KR | 101415175 B1 | | 7/2014 | |
| PT | 109249 A | * | 9/2017 | ............ H01B 1/24 |
| WO | 2013049498 A1 | | 4/2013 | |
| WO | 2017095699 A1 | | 8/2017 | |
| WO | 2018212889 A2 | | 11/2018 | |
| WO | 2019032554 A1 | | 2/2019 | |

OTHER PUBLICATIONS

Singh et al ("Effect of hydrogen concentration on graphene synthesis using microwave-driven plasma-mediated methane cracking", Carbon 143 (2018) 802-813 available online Dec. 3, 2018). (Year: 2018).*
Machine Translation of PT 109249 A (Year: 2017).*
Gautier, M. et al., "Direct decarbonization of methane by thermal plasma for the production of hydrogen and high value-added carbon black," International Journal of Hydrogen Energy, 2017, 1-17.
Gautier, M. et al., "Direct Decarbonization of Methane by Thermal Plasma for the Production of Hydrogen and High Value-Added Carbon Black," International Journal of Hydrogen Energy, vol. 42, Issue 47, 2017, pp. 28140-28156 (abstract only).
Frenklach, M., "Reaction Mechanism of Soot Formation in Flames," Phys. Chem. Chem. Phys., 2002, 4: pp. 2028-2037.
International Search Report and Written Opinion dated Oct. 8, 2020 issued in international application No. PCT/US2020/022309 (8 pages).
Vander Wal et al., "Microwave-Driven Plasma-Mediated Methane Cracking: Product Carbon Characterization", C Journal of Carbon Research, 4, p. 61, https://doi.org/10.3390/c4040061, Nov. 8, 2018 (Nov. 8, 2018).
Examination Report dated Mar. 13, 2025 for Canadian Patent Application No. 3132048, 6 pages.

* cited by examiner

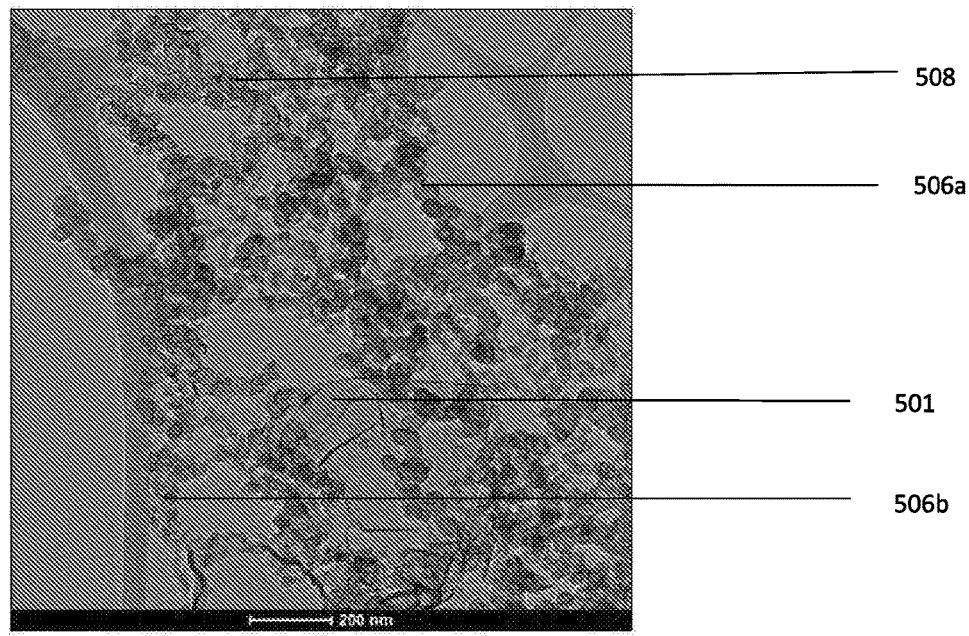
FIG. 5
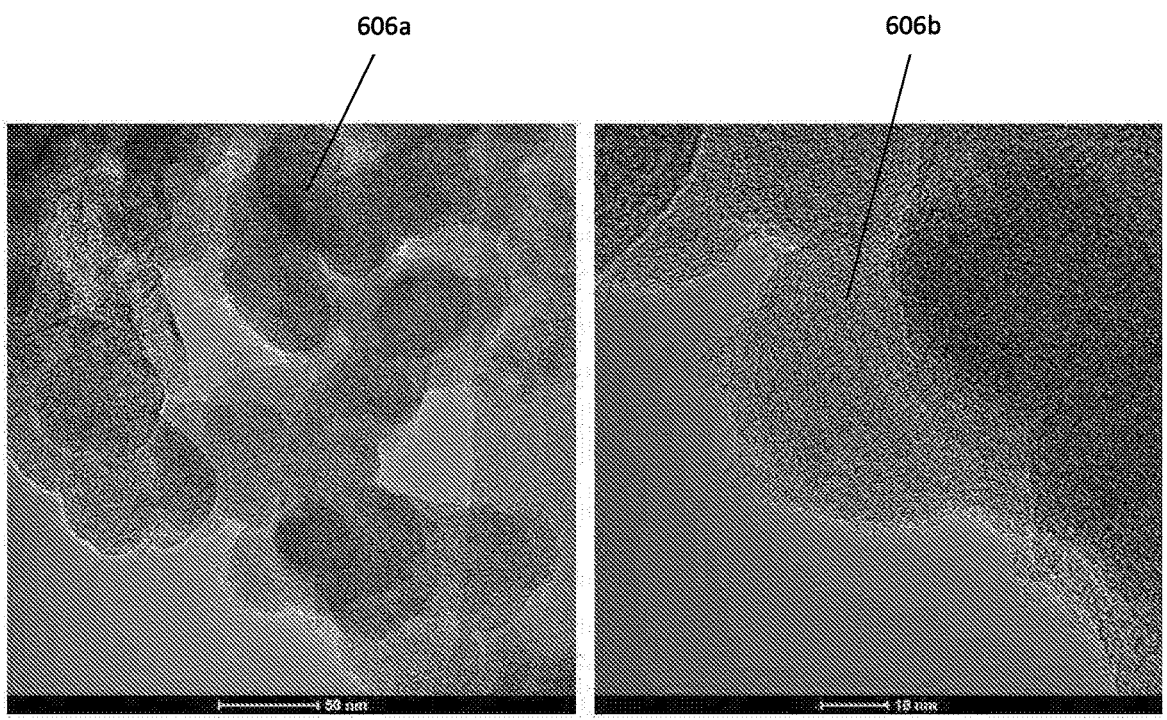
FIG. 6A                                  FIG. 6B

| Peak Number | Compound Name | Retention Time |
|---|---|---|
| 1 | Ethylbenzene | 7.975 |
| 2 | Benzene, 1,3-dimethyl- | 8.433 |
| 3 | o-Xylene | 8.55 |
| 4 | Napthalene | 18.167 |
| 5 | Naphthalene, 2-methyl- | 20.358 |
| 6 | Naphthalene, 1-methyl- | 20.658 |
| 7 | Acenaphthylene | 23.133 |
| 8 | Fluorene | 25.267 |
| 9 | Phenanthrene | 28.158 |
| 10 | Anthracene | 28.308 |
| 11 | Benzo[def]fluorene | 29.958 |
| 12 | Fluoranthene | 31.775 |
| 13 | Pyrene | 32.45 |
| 14 | 2,3-Benzofluorene | 33.692 |
| 15 | Pyrene, 1-methyl- | 34.142 |
| 16 | Acepyrene | 35.492 |
| 17 | Benzo[ghi]fluoranthene | 36.083 |
| 18 | Benzo[j]fluoranthene | 39.15 |
| 19 | Perylene | 40.017 |
| 20 | Benzo[e]pyrene | 40.2 |
| 21 | o-Phenylenepyrene | 43.208 |
| 22 | Benzo[ghi]perylene | 43.508 |
| 23 | Coronene | 46.258 |
| 24 | 1,2:3,4-Dibenzopyrene | 46.542 |

FIG. 10

NANOCARBON MATERIAL AND APPLICATIONS OF NANOCARBON MATERIAL

CROSS-REFERENCE TO RELATED APPLICATIONS

This application claims the benefit of priority of U.S. Provisional Application No. 62/817,309, filed on Mar. 12, 2019, and U.S. Provisional Application No. 62/817,317, filed on Mar. 12, 2019. The entire disclosures of the applications noted above are hereby incorporated by reference.

STATEMENT OF FEDERALLY SPONSORED RESEARCH

This invention was made with United States government support under contract numbers DE-SC0018703 and DE-SC0017227, awarded by the United States Department of Energy. The United States government has certain rights in this invention.

BACKGROUND

Carbon nanomaterials are useful for a wide range of applications. Such nanomaterials containing graphene are particularly desirable. Graphene is a crystalline allotrope of carbon, made up of a single layer of carbon atoms. Its carbon atoms are packed densely in a regular atomic-scale hexagonal pattern, which is commonly referred to as a hexagonal lattice. Due to its unique structure, graphene has several uncommon properties. For example, each carbon atom in a graphene sheet is covalently bonded to three other carbon atoms, giving graphene its unusual strength. Graphene displays remarkable electron mobility at room temperature, and is able to conduct heat and electricity efficiently. Additionally, graphene is nearly transparent.

Due to its properties, graphene is valuable for many applications. For example, it may be an additive in electrically conductive polymer compounds, composite materials, elastomers, coatings, battery electrodes, inks, mechanically reinforced composite materials, barrier films, thermally conductive polymer compounds, and electromagnetic shielding components, among other things. However, graphene can be difficult to use, as graphene sheets tend to stack to form graphite. This stacking is analogous to flat sheets of printer paper, which tend to stack easily and stick together. The strong interfacial forces between stacked sheets of graphene undesirably makes it difficult to achieve a homogenous dispersion of graphene platelets, and leads to clumping.

This tendency of graphene sheets to clump is disadvantageous for several reasons. For example, nano-scale carbon materials have shown promise as corrosion-resistant additives in concrete and concrete sealers. This is important, as corrosion is a leading factor in the degradation of reinforced concrete used, for example in the construction of transportation infrastructure. The inevitable development of cracks and pores allows the penetration of aggressive agents, such as sea water in coastal areas and road salt in cold climates, which corrode reinforcing steel rebar and destroy concrete structures. The annual cost of such corrosion is high, for example, in the United States, the annual direct cost of corrosion for highway bridges is estimated to be $13.6 billion. Graphene nanoplatelets are an emerging material that, when added to concrete at low loadings, have shown significant improvements in compressive and tensile strengths, water impermeability, electrical conductivity, and deflection under load. However, their commercial use has not been feasible due to low availability, and high costs of production. Milled or exfoliated graphite has been used for this purpose, however, not only does it have poor chemical purity, as noted above, it has a tendency to clump up, which precludes its widespread adoption as an industrial additive.

Thus, there is a need for a graphene-containing material that provides the special properties of graphene, but also addresses at least one of the above-mentioned limitations associated with using graphene.

SUMMARY

The embodiments described in this document involve nanocarbon materials containing agglomerate nano structures.

In some embodiments, a nanocarbon material includes agglomerate nanostructures comprising aggregates of: (i) graphene nanostructures having an at least partially crumpled morphology, and (ii) clusters of at least one carbon material. At least a portion of the carbon material may have a graphitic structure. At least a portion of the graphitic structure may be at least partially hollow and has at least one winged protrusion.

In some embodiments, at least a portion of the carbon material has an amorphous structure. In some embodiments, the carbon material has at least one morphology selected from the group consisting of capsules, spherules, onion-like particles, rosette-type particles or a combination thereof. In some embodiments, the carbon material does not have a nanotube morphology. In some embodiments, the carbon material comprises capsules, and the capsules are at least partially hollow. In some embodiments, the carbon material comprises spherules, which may be at least partially hollow and/or amorphous. In some embodiments, the graphene nanostructures may be crumpled nanostructures that have a surface area of from about 100 $m^2/g$ to about 1500 $m^2/g$. In some embodiments, the crumpled graphene nanostructures have a lateral dimension of from 20 nm to 500 nm. In some embodiments, the aggregates may have an average size of from 100 nm to 1000 nm. In some embodiments, the nanocarbon material comprises substantially no ash, metal atoms, or heteroatoms, or a combination thereof. In some embodiments, the nanocarbon material is surface-functionalized. In some embodiments, the nanocarbon material is surface-functionalized during formation, post-processing, or a combination thereof. In some embodiments, the nanocarbon material is functionalized to express alkyl, substituted alkyl, phenyl, aryl, substituted phenyl, substituted aryl, hydroxyl, carboxyl, carbonyl, halo, ether, azo, substituted azo, and sulfo moieties, and a combinations thereof. In some embodiments, the nanocarbon material is in the form of a powder, or pellets. In some embodiments, the nanomaterial may have been activated with at least one of heat, steam or $CO2$ plasma. In some embodiments, the nanocarbon material comprises at least one light polycyclic compound having a carbon atomic count of no more than 100. In some embodiment, the at least one light polycyclic compound may have been separated through application of at least one of solvent, heat, or microwave plasma. In some embodiments, the light polycyclic compound in the nanomaterial may be suitable for production of at least one of amorphous coke, sponge coke, honeycomb coke, needle coke, battery carbons, isotropic pitch, mesophase pitch, mesocarbon microbeads (MCMB), carbon fiber, activated carbon, battery-grade graphite, anode graphite, synthetic graphite, nuclear graphite, or electrode graphite. In some embodiments, the nanomaterial has a carbon:hydrogen atomic ratio of at least 60. In some embodiments, the nanomaterial has a bulk conductivity of at least 20,000 S/m, when measured at 1 kN compression force.

Another aspect of this disclosure provides a composition comprising the nanocarbon material of the first aspect described above, along with a dispersion medium or a cementitious material.

In various embodiments, the dispersion medium may be selected from the group consisting of an aqueous solution, a solvent, an oil, an alcohol, a matrix, a coating, a paint, or an ink. The nanocarbon material may be dispersed in the dispersion medium. In some embodiments, the dispersion medium comprises a matrix, and the composition is a composite. In some embodiments, the matrix comprises a polymer, ceramic or metal. In some embodiments, the composite is suitable for use in one or more of the following: concrete, mortar, cement, metal, polymer, plastic, rubber, sealant, wax, aerogel, foam, coating, sorbent, catalyst support, epoxy, resin, carbon, asphalt, sealant, adhesive, polymer, battery, fuel cell, supercapacitor, ink, coating, or thermal insulator. In some embodiments, the matrix comprises a polymer that is selected from the group consisting of a thermoset, thermoplastic, resin, urethane, or rubber. In some embodiments, the matrix comprises a titanium metal. In some embodiments, the matrix comprises a polymer that is selected from the group consisting of a polystyrene, polyacrylate, polyolefin, functionalized polyolefin, polyester, polyurethane, polyether, polysiloxane, and combinations thereof. In some embodiments, the functionalized polyolefins are selected from the group consisting of poly(vinyl chloride), poly(vinyl acetate), poly(vinyl alcohol), and polyacrylonitrile. In some embodiments, the agglomerate nanostructures are present in an amount of from about 0.01 weight % to about 10 weight % in the composition. In some embodiments, the cementitious material is selected from the group consisting of a cement, concrete and mortar.

A further aspect provides a method of making a cementitious composition, comprising the steps of: (i) providing a nanocarbon material such as that described above, along with a cementitious material; (ii) adding the nanocarbon material to an aqueous media, creating a dispersion; (ii) stabilizing the dispersion; and (iii) adding the dispersion to a cementitious material; wherein the dispersion is stabilized by either (a) functionalizing the nanocarbon material prior to dispersing it in the aqueous medium or (b) adding a dispersion aid to the dispersion.

In some embodiments, the nanocarbon material is functionalized using a salt selected from the group consisting of an oleum, nitric acid, ozone, potassium permanganate or diazonium salt, or a combination thereof. In some embodiments, the dispersion aid is selected from the group consisting of a naphthalene, sulfonate, polycarboxylate ether, polymer-based plasticizer, surfactant, or a combination thereof. In a further embodiment, the agglomerate nanostructures are present in an amount of from about 0.01 weight % to about 10 weight % in the composition.

BRIEF DESCRIPTION OF THE DRAWINGS

FIG. 5 depicts an HRTEM image of graphene nanostructures co-formed with both partially hollow popcorn-like carbon materials and amorphous carbon materials.

FIG. 6A depicts an HRTEM image showing an agglomeration of amorphous carbon structures.

FIG. 6B is an HRTEM magnified view of the amorphous carbon structures in FIG. 6A. The amorphous carbon structures are dense and solid, with no prevailing structure.

FIG. 10 depicts the polycyclic compounds identified in a gas chromatography-mass spectrometry (GC/MS) spectrogram identifying the polycyclic compounds extracted from a sample of nanocarbon material.

DETAILED DESCRIPTION

This document describes a nanocarbon material containing a plurality of agglomerate nanostructures. These agglomerate nanostructures are made of a collection of aggregates. These aggregates are attracted to each other, and may congregate together to form clumps, or agglomerates. In some embodiments, at least a portion of the aggregates may be fused together. The aggregates in the agglomerate nanostructures are not strongly bonded or attracted to each other, and may thus be separated, by relatively mild processing, for example, by sonication. Referring to the example images of FIGS. 1 and 2, the aggregates contain two different types of primary particles, namely, graphene nanostructures 101a and 101b, and carbon material 201a and 201b.

Figure 2:
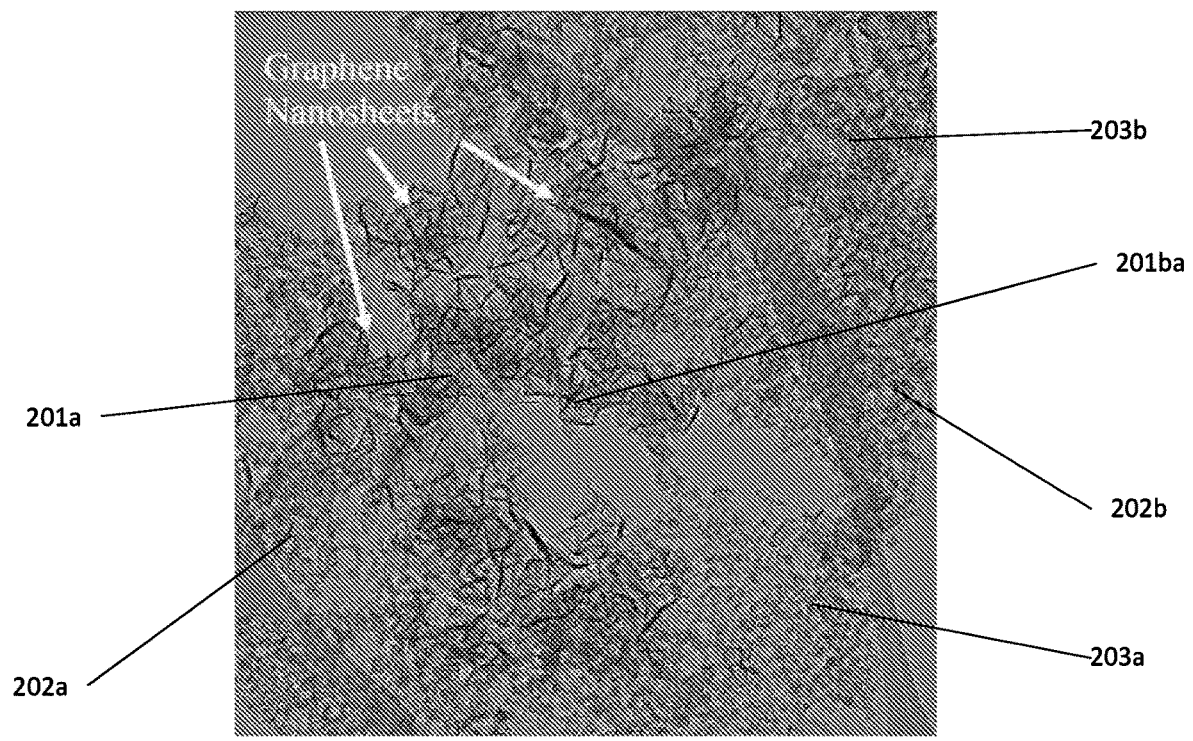
FIG. 2 depicts a widefield High-resolution transmission electron microscopy (HRTEM) image of graphene nanostructures integrated with spheres of carbon material.
Figure 3:
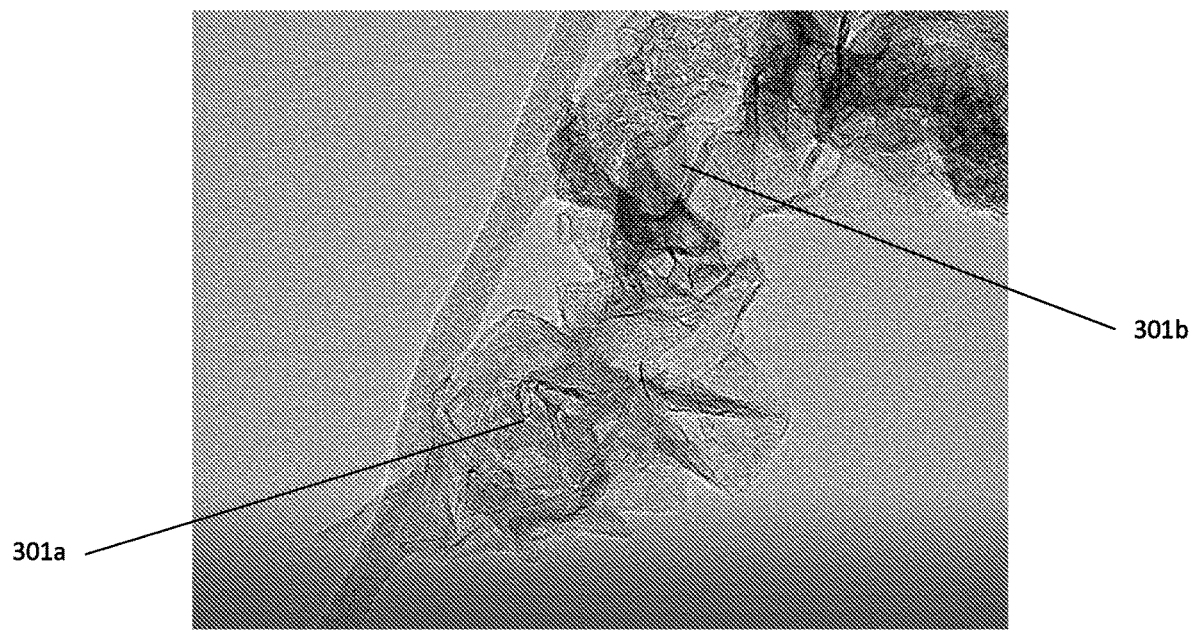
FIG. 3 depicts an HRTEM image showing crumpled graphene nanostructures at high magnification.

Referring to the example images of FIGS. 2 and 3, the graphene nanostructures are graphene nanoplatelets 201a, 201b, 301a and 301b, that have an overall shape or morphology that is at least partially crumpled. Their appearance may be reminiscent of a partially or completely crumpled sheet of paper. Each graphene nano structure contains at least one graphene nanoplatelet. Graphene nanoplatelets are nanoparticles made of platelet-shaped graphene sheets, which are made of layers of carbon atoms arranged in a planar hexagonal pattern and are a basic structural element of many other allotropes of carbon, such as graphite, charcoal, carbon nanotubes and fullerenes. In some embodiments, the crumpled graphene nanostructures have a lateral dimension of from about 20 nm to about 500 nm. In other embodiments, the crumpled graphene nanostructures have a surface area of from about 100 m2/g to about 1500 m2/g. In some embodiments the graphene nanoplatelets may contain from 1 to 3 layers of graphene. In other embodiments the graphene nanoplatelets may contain from 4 to 6 layers of graphene. In other embodiments, the graphene nanoplatelets may contain from 7-10 layers of graphene. The layers of graphene may be arranged in a turbostratic pattern.

The graphene nanostructures may contain any suitable number of carbon atoms. In some embodiments, graphene nanostructures may be formed incrementally in the gas phase from hydrocarbon feedstocks via the hydrogen-abstraction/acetylene addition (HACA) mechanism (see e.g. Gautier M, et al., *Direct Decarbonization Of Methane By Thermal Plasma For The Production of Hydrogen and High Value-Added Carbon Black*, International Journal of Hydrogen Energy (2017); Frenklach M, *Mechanism of Soot Formation in Flames*, Phys. Chem. Chem. Phys., 2002, 4, 2028-2037)), starting from single and polycyclic nuclei, such as benzene and naphthalene. In some embodiments, graphene nanostructures are formed incrementally from hydrocarbon feedstocks in gas phase, ionized with microwave plasma, which induces an electric charge to the polyclic nuclei, thus suppressing collision and agglomeration of nuclei, and supporting chemical planar growth through the HACA mechanism. In some embodiments, graphene nanostructures are formed incrementally from hydrocarbon feedstocks in gas phase, ionized with microwave plasma, with the addition of other inert, reducing, or oxidizing gases such as H2 or CO2, which may accelerate or suppress the HACA mechanism, thus controlling the growth rate, as well as the size and concentration of the graphene nanostructures in nanocarbon material. In some embodiments, the graphene nanostructure carbon atom count may range from 100 to 100 billion. In some embodiments, the graphene nanostructure carbon atom count may range from 1,000 to 100,000. In some embodiments, graphene nanostructure carbon atom count may range from 10,000 to 10 million. In some embodiments, graphene nanostructure carbon atom count may range from 100,000 to 100 million. In some embodiments, graphene nanostructure carbon atom count may range from 1 million to 1 billion. In some embodiments, the graphene nanostructure carbon atom count may range from 100 million to 100 billion. In some embodiments, due to their incremental formation from polycyclic nuclei in the gas phase, the graphene nanostructure carbon atom count may be less than 100 atoms, with polycyclic structures having a carbon count ranging from about 100 to about 6, from 100 to about 50, from about 50 to about 24, or from about 24 to about 6 atoms.

In some embodiments, the nanocarbon material may be surface functionalized to give the nanocarbon material particular desired properties. This surface functionalization may occur, for example, during formation or post-processing of the nanocarbon material, or a combination thereof. Examples of suitable functional moieties include, for example, alkyl, substituted alkyl, phenyl, aryl, substituted phenyl, substituted aryl, hydroxyl, carboxyl, carbonyl, halo, ether, azo, substituted azo, sulfo functional groups, and combinations thereof. The graphene nanostructures may be surface functionalized during formation or post-processing of the nanocarbon material, or a combination thereof. In some embodiments, the nanocarbon material may be functionalized on the surface of the graphene nano structures.

Figure 1:
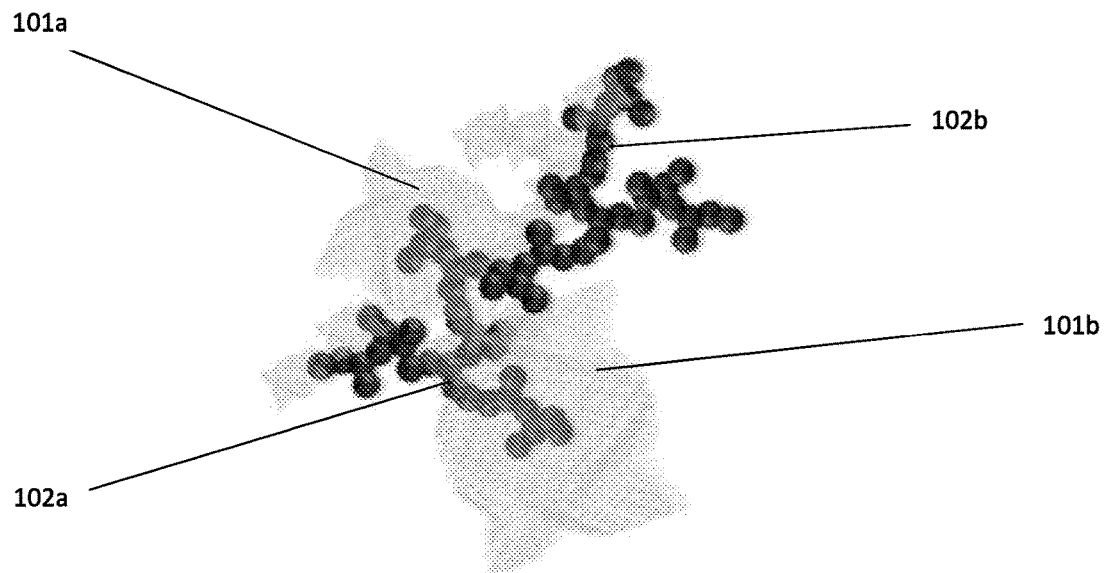
FIG. 1 depicts a schematic representation of a nanocarbon material including aggregates of graphene nanoplatelets having a partially crumpled morphology and clusters of carbon material.
Figures 4A, 4B, 4C:
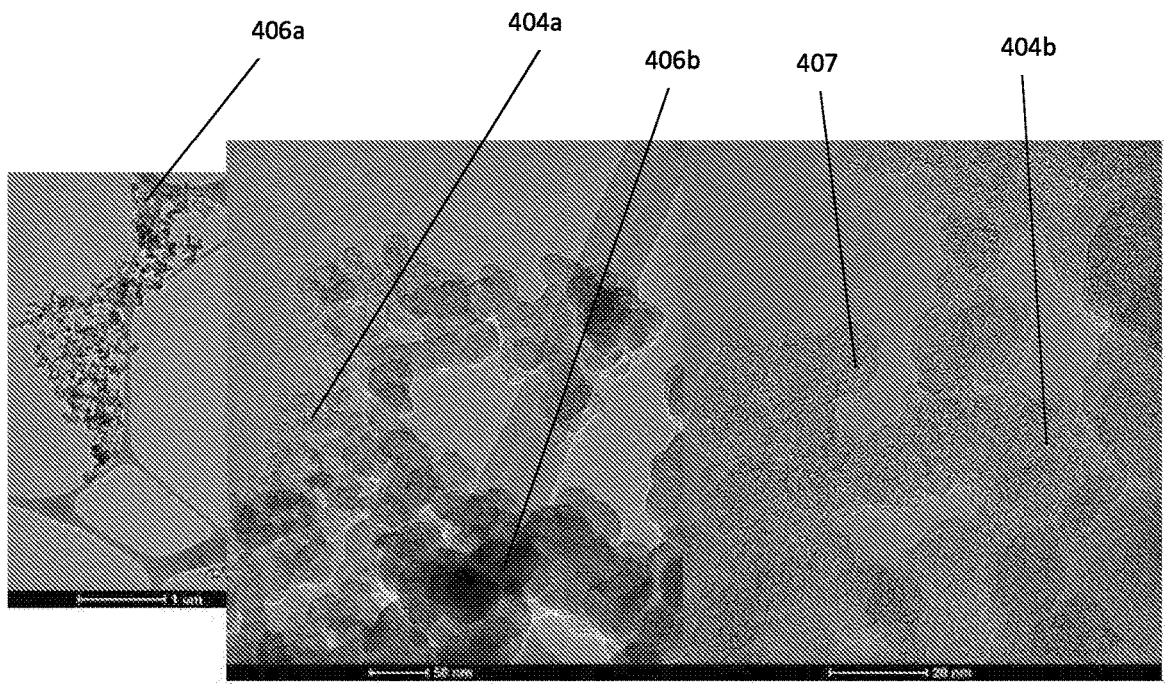
FIG. 4A. depicts an HRTEM image of clusters of popcorn-like carbon materials.
FIG. 4B. depicts an HRTEM magnified view of the clusters of popcorn-like carbon materials in FIG. 4A.
FIG. 4C. depicts an HRTEM magnified view of the clusters of popcorn-like carbon materials in FIG. 4B.
Figure 7:
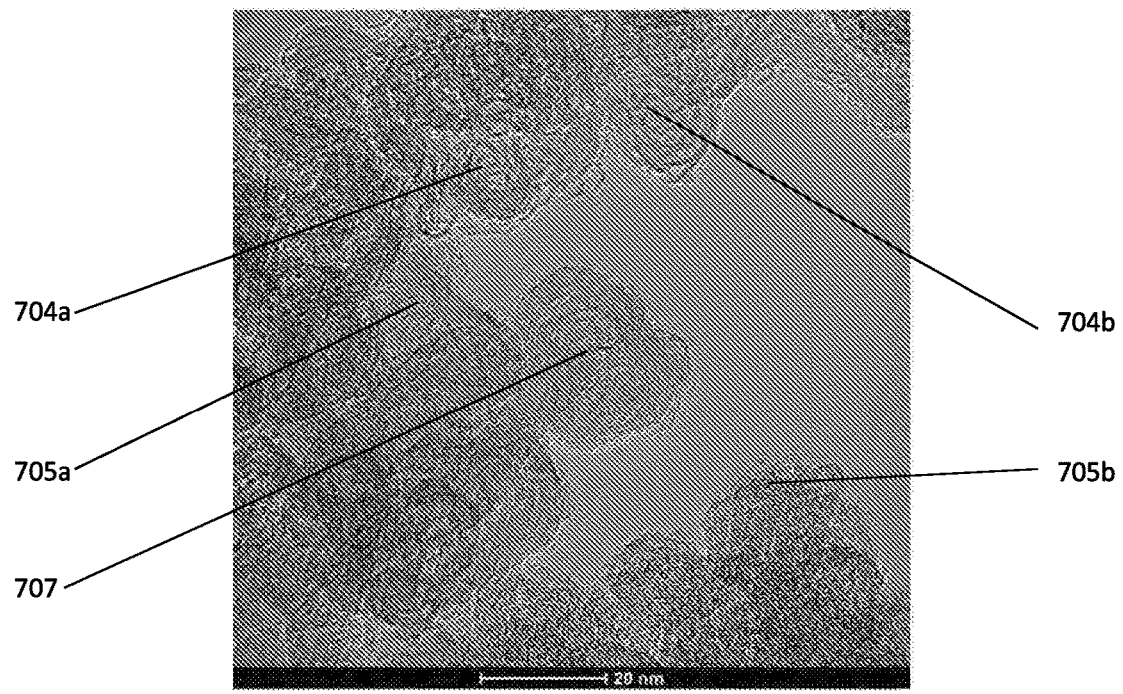
FIG. 7 depicts an HRTEM image of a cluster of spherules of carbon material, where the cluster has a popcorn-like appearance including a partially hollow interior, a clear crystalline structure, and winged protrusions extending from the carbon material.
Figure 8:
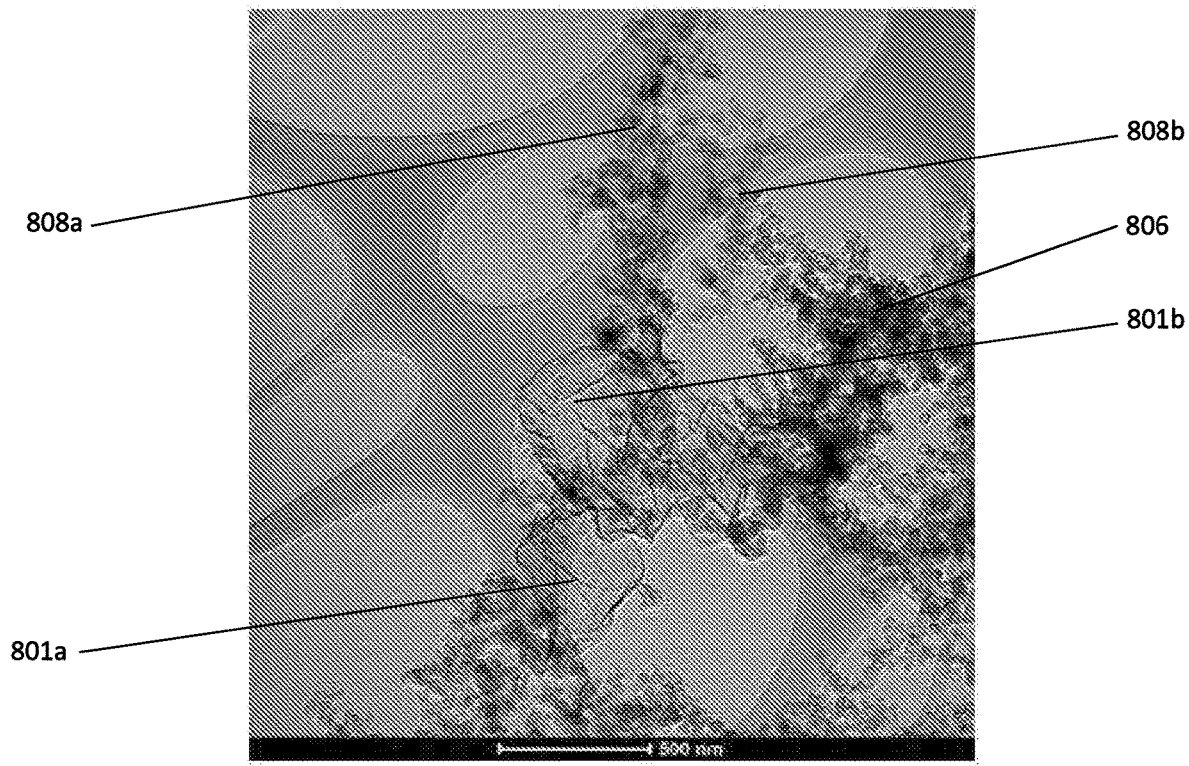
FIG. 8 depicts sheets of large sized graphene nanostructures co-formed with partially hollow popcorn-like carbon materials and amorphous carbon material.

Referring to the example images of FIGS. 1, and 2, the carbon material 102*a*, 102*b*, 202*a* and 202*b* is in the form of clusters of nodules 203*a* and 203*b* that may vary in morphology, for example the nodules may be in the form of capsules, spherules (i.e., spherical), onion-like particles, rosette-type particles or a combination thereof. In some embodiments, the carbon material does not have a nanotube morphology. At least a portion of the carbon material in each aggregate has a high crystallinity, and thus has a graphitic structure. Referring to the example images of FIGS. 4A, 4B, 5 and 8, at least a portion of the carbon material may have a low crystallinity, and may thus be amorphous 406*a* 406*b*, 506*a*, 506*b* and 806. Referring to the example images of FIGS. 6A and 6B these amorphous structures 606*a* and 606*b* may be at least one of dense, solid, or have no prevailing structure. The amorphous structures may have a size of from about 30 to about 70 nm, and may have an average size of about 50 nm. At least a portion of the graphitic structure may be at least partially hollow. These hollow portions may contain hollow capsules or hollow spherules, or both, in the carbon material. Referring to the example images of FIGS. 4B, 4C and 7, at least some of the hollow spherules 404*a*, 404*b*, 704*a* and 704*b* may be at least partially hollow 705*a* and 705*b* and have at least one winged protrusion 407 and 707 extending from the spherules 704*a* and 705*b*, giving them a popcorn-like appearance. The popcorn-like carbon structures may have a size of from about 15 to about 35 nm, and may have an average size of about 20 nm. Their smaller size, and lighter weight enables them to provide improved conductivity.

The graphene nanostructures are co-formed with the carbon material, and as a result, each cluster of carbon material is rigidly attached to at least one graphene nanostructure. For example, referring to the example images of FIGS. 5, and 8, each popcorn-like carbon material 508, 808*a* and 808*b* is attached to at least one graphene nanostructure 501, 801*a* and 801*b*; and likewise, each amorphous carbon material 506*a* and 506*b* is attached to at least one graphene nano structure 501.

In some embodiments, the nanocarbon material contains little to no ash, metal atoms or heteroatoms. In other embodiments, the nanocarbon material is in the form of a powder. In some embodiments, nanocarbons material may be mechanically pelletized, in order to reduce the nanocarbon material bulk density, or to improve ease of use or transportation.

The nanocarbon material has a variety of uses, and thus may be used in several different types of composition. For certain uses, the nanocarbon material may be dispersed in a medium, such as, for example, an aqueous solution, a solvent, an oil, an alcohol, a matrix, a coating, a paint, or an ink. Where the dispersion medium is a matrix, the resulting composition may be a composite, which may be suitable for use, for example, as a concrete, metal, polymer, plastic, rubber, cement, sealant, wax, aerogel, foam, coating, sorbent, catalyst support, epoxy, resin, carbon, asphalt, sealant, or adhesive. Depending on the end use, the matrix may be, for example, a polymer, ceramic or metal. Suitable polymers include, for example, polystyrene, polyacrylates, polyolefins, functionalized polyolefins (such as poly(vinyl chloride), poly(vinyl acetate), poly(vinyl alcohol) and polyacrylonitriles), polyesters, polyurethanes, polyethers, and polysiloxanes. Suitable metals include, for example, titanium. In some embodiments of the invention, the agglomerate nanostructures may be present in the composition in an amount of from about 0.01 weight % to about 0.1 weight %, or from about 0.1 wt % to about 1 wt %, or from about 1 wt % to about 10 weight %, based on the total weight of the composition.

The unique graphene-enriched nanocarbon material described in this document offers the unique advantages of both the crumpled graphene nanostructures and the carbon material, while offering a solution to some of the primary limitations that each type of material has independently. Achieving a homogenous dispersion of graphene platelets is often difficult due to strong interfacial forces between the planar sheets. The heterogeneous morphology of the nanocarbon material encourages separation, as the branched clusters of spherical nodules preclude stacking and clumping of the graphene nano structures. This characteristic is particularly important when the nanocarbon material is to be mixed with viscous materials, such as polymers. While the clusters of carbon material promote dispersibility of the crumpled graphene nanostructures, the crumpled graphene nanostructures, in turn, provide performance enhancements, such as at least one of, strength, impermeability and conductivity. The graphene-enriched nanocarbon material thus provides the benefits of graphene, with the dispersibility of a carbon material.

The nanocarbon materials may also provide at least one improved mechanical or physical property, such as for example, tensile strength, fracture toughness, storage modulus, Young's modulus, resistance to UV radiation, resistance to abrasion, resistance to delamination, peeling strength, reduced penetration of corrosive agents, impermeability to gas or liquid, promotion of rapid heat dissipation, operational temperature, durability, toughness, impact resistance, longevity, compressive strength, thermal conductivity, electrical conductivity, heat capacity, flexural strength, strain rate, harness, tortuosity of capillaries, working time, stiffness, or a combination thereof. In addition, the nanocarbon materials may provide at least one of reduced porosity, critical pore diameter, chloride penetration rate, migration coefficient, corrosion rate, water penetration depth, bulk density, crack or microcrack propagation, weight and density. These nanocarbon material properties make it useful for several applications, such as for example, in composites such as a cementitious material such as concrete, cement paste, or mortar, adhesives, resins, sealants, coatings, epoxies, polymers, fiber reinforced polymers, organic matter or metal.

Figure 9A:
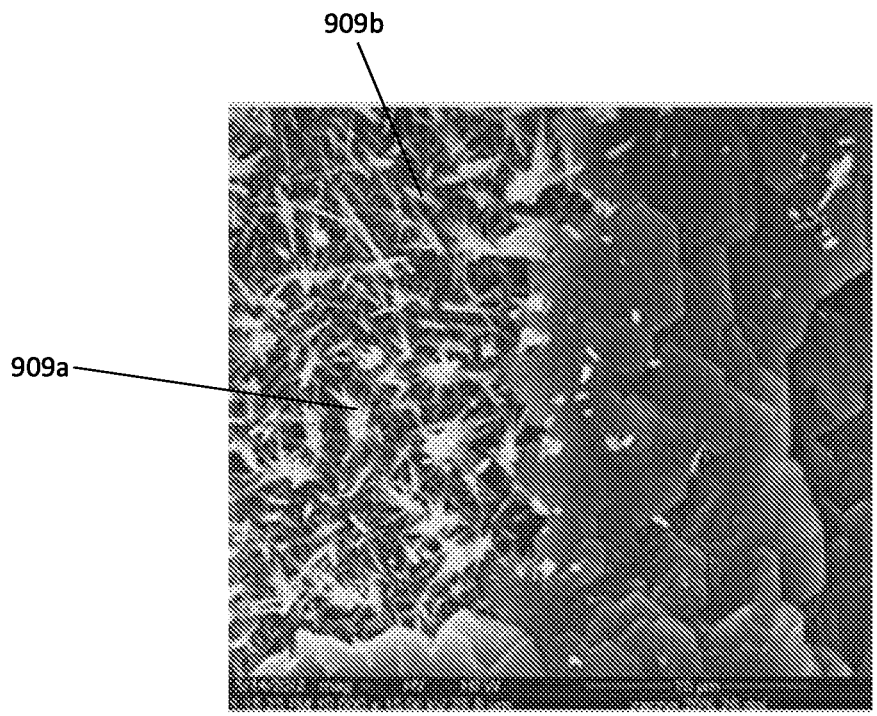
FIG. 9A depicts an image of the needle form of calcium-silicate-hydrate (C—S—H) and graphene plates of portlandite.
Figure 9B:
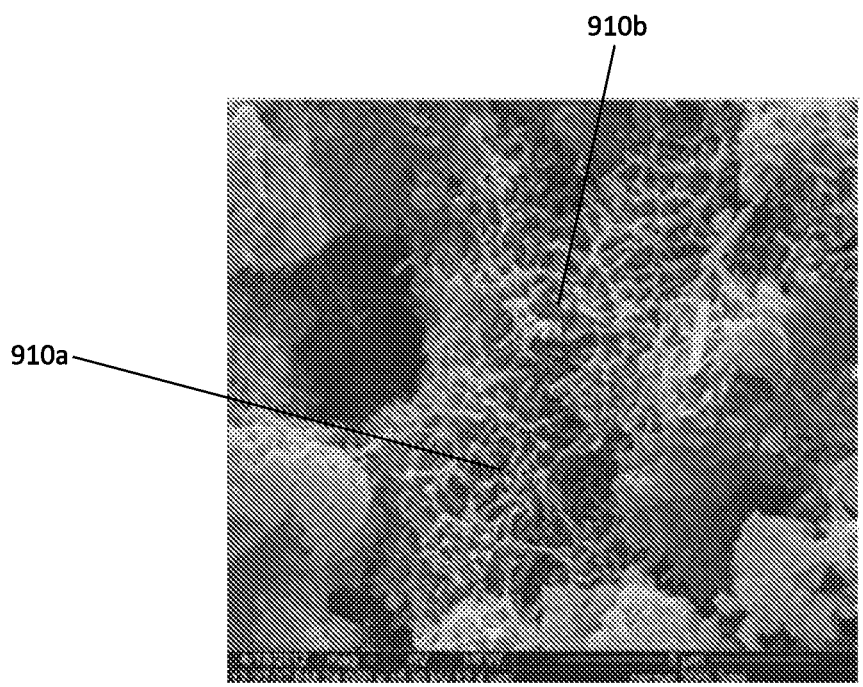
FIG. 9B depicts an image showing the transformation of portlandite into solid forms, and needle forms, of C—S—H into a cement microstructure partially resembling a honeycomb structure.

When used in a cementitious material, the nanocarbon material may provide enhanced performance, while allowing a reduction in the amount of cementitious material needed to achieve predetermined specifications. As shown in FIGS. 9A and 9B, the nanocarbon material may encourage fast growth, and guide crystallization of needle-like calcium-silicate-hydrate (C—S—H) forms 909a and 909b having a relatively small size, which may refine the cement microstructure, with some portions resembling a honeycomb 910a and 910b, and which may contribute to the reductions in the amount of cement needed. As a portion of the C—S—H foils are displaced by lower density, higher strength crumpled graphene sheets, the mechanical interactions of the C—S—H needles and the nanocarbon material may intensify local bond strengths, leading to a net improvement in rigidity, while clusters of carbon material add to the nanocarbon material's compressive strength and maintain the graphene platelet separation. The nanocarbon material may enhance the barrier properties of concrete, and may intensify the hydration process through local disproportionation of water concentrations. Once the curing process is completed, graphene sheets may intersect and cut off the concrete microcapillary structure, impeding the transport of water and corrosive agents (for example chloride ions or sulfuric compounds). Furthermore, nanocarbon material may increase the overall thermal conductivity of concrete and reduce micro-crack formation caused by the exothermic hydration process. Nanocarbon material well-dispersed throughout the concrete matrix may also create a closed conductive network, thus enabling a durable structural integrity sensor, where changes in the structure conductivity indicate internal crack formation and weakening, as well as a cathodic protection system enabling an additional corrosion control mechanism.

Additional uses for the nanocarbon material include, for example, conductive applications (for example, batteries, fuel cells, supercapacitors, inks, and coatings); applications where improved thermal conductivity, resistance to delamination or modified coefficient of thermal expansion is sought (for example, adhesives, resins, sealants, coatings, epoxies and polymers); applications where infrared radiation is absorbed and reflected back (for example thermal insulations); and for applications requiring modifications in the properties of heat exchange fluids, such as for example, increased or decreased heat capacity, or increased heat transfer rate.

Conductive nanocarbon materials are frequently used to boost conductivities of non-conductive materials such as polymers and rubbers. The bulk conductivity of the nanocarbon material may be measured, for example, using a standard 4-probe conductivity measurement device. Bulk conductivity may be measured, for example, at about 250, 500, 750, or 1000 N of compression force. Higher bulk conductivities typically translate into higher end material conductivities at lower loading factors. Lower loading factors translate into lower costs, easier manufacturing, especially for mixing in viscous polymer matrices, and better preservation of original material properties. The nanocarbon material may have any suitable bulk conductivity. In some embodiments, the nanocarbon material may have a bulk conductivity of 50 S/m-100000 S/m. In some embodiments, the nanocarbon material may have a bulk conductivity of 100 S/m-50000 S/m. In some embodiments, the nanocarbon material may have a bulk conductivity of 200 S/m-25000 S/m. In some embodiments, the nanocarbon material may have a bulk conductivity of 300 S/m-15000 S/m. In some embodiments, the nanocarbon material may have a bulk conductivity of 400 S/m-10000 S/m. In some embodiments, the nanocarbon material may have a bulk conductivity of 500 S/m-5000 S/m. In some embodiments, the nanocarbon material has a bulk conductivity of at least 20,000 S/m, when measured at 1 kN compression force.

Higher conductivity is correlated with higher carbon purity, carbon:hydrogen atomic ratio, and graphitic and graphenic carbon concentration; and lower amorphous carbon content, and light polycyclic structure (fewer than 100 carbon atoms) concentration. By "graphitic" is meant herein, of graphite or containing graphite. By "graphenic" is meant herein, of graphene or containing graphene. The nanocarbon material may have any conductivity that is suitable for the intended use of the nanocarbon material. In some embodiments the nanocarbon material may have a carbon purity of greater than 97.5%, greater than 99%, or greater than 99.9%.

The nanocarbon material may have any suitable carbon: hydrogen atomic ratio. In some embodiments, the nanocarbon material may have a carbon:hydrogen atomic ratio of greater than 6:1, greater than 20:1, greater than 60:1, or greater than 120:1.

The properties of the nanocarbon material are influenced by the composition of the nanocarbon material. Thus, the amount of amorphous, graphitic, or graphenic carbon material in the nanocarbon material may be selected based on the desired properties. In some embodiments, the amorphous carbon concentration may be relatively low. For example, in some embodiments, the amorphous carbon concentration may be less than 50%, less than 10%, or less than 1%, based on the total amount of nanocarbon material. In some embodiments, the graphitic and graphenic carbon concentration in the nanocarbon material may have relatively high. For example, in some embodiments the concentration of either graphitic or graphenic concentration, or the total graphitic and graphenic concentration may be greater than 50%, greater than 90%, or greater than 99%, based on the total amount of nanocarbon material. In some embodiments, the concentration of light polycyclic (less than 100 carbon atoms) structures may be relatively low. For example, in some embodiments the concentration of light polycyclic structures may be than 10%, less than 2%, or less than 0.2%, based on the total amount of nanocarbon material.

The combination of the above-mentioned parameters may be selected to provide the desired nanocarbon material properties. The bulk conductivity of the nanocarbon material will be influenced by the parameters selected. For example, in some embodiments, a nanocarbon material with a high concentration of light polycyclic structures (for example 5%-20%) may have a low carbon:hydrogen atomic ratio of 6:1 to 20:1, and may a have bulk conductivity of from 50 S/m to 500 S/m. In some embodiments, a nanocarbon material having a lower concentration of light polycyclic structures (for example 2%-10%, or less than 5%) may have a higher carbon:hydrogen atomic ratio of 20:1 to 60:1, and may have a bulk conductivity of from 500 S/m to 5000 S/m. The nanocarbon material with a very low concentration of light polycyclic structures (for example 0.2%-2%, or less than 0.2%) may have a carbon:hydrogen atomic ratio of from 60:1 to 120:1, or higher, and it may have a bulk conductivity of from 5000 S/m to 2000 S/m. In some embodiments, a nanocarbon material having high graphitic and graphenic carbon contents (for example 80%-100%), may have correspondingly lower amorphous carbon contents (for example, 20% or less), and it may have a greater bulk conductivity of for example from 10,000 to 100,000 S/m, or higher. In some embodiments, a nanocarbon material having a high amorphous carbon content (for example 50%-100%) and correspondingly lower graphitic or graphenic carbon contents (for example, less than 50%) may have a lower bulk conductivity of from 100 S/m to 2,000 S/m.

In some embodiments, at least one light polycyclic carbon (carbon molecule having an atom count of less than 100) is attached to the nanocarbon material. Light polycyclic carbons are composed of multiple aromatic rings. Referring to the example images of FIG. 10, examples of light polycyclic carbon include, but are not limited to coronene, bezoperylene, benzipyrene, pentacene, pyrene, chysene, tetracene, phenalene, phenanthrene, anthracene, naphthalene, their isomers and corresponding methylated and saturated compounds, and combinations thereof. In some embodiments, the light polycyclic carbons can be extracted out of the nanocarbon material using solvents. Any suitable solvent may be used, such as, for example, pentane, benzene, toluene, dichloromethane, tetrahydrofurane, pyridine, quinoline, acetone, supercritical carbon dioxide and combinations thereof. In some embodiments, the light polycyclic carbons can be extracted out of the nanocarbon material using heat treatment, non-thermal treatment or microwave plasma. Suitable heat treatments include, for example, electrically induced heating. Heat treatment may be conducted at any suitable temperature, such as for example, greater than 300° C., greater than 650° C., or greater than 850° C. Heat treatment may be conducted during any suitable time period, such as, for example, greater than 10 seconds, greater than 1 minute, more preferably greater than 10 minutes, or greater than 1 hour. The appropriate temperature will vary depending on the length of heat treatment. For example, in some embodiments, heat treatment may last 10-30 minutes at temperatures of 650° C.-850° C. In other embodiments, heat treatment may last 5-15 minutes at temperatures of 800° C.-1000° C. In other embodiments, heat treatment may last 1-10 minutes at temperatures of 900° C.-1100° C. In some embodiments, heat treatment may last 10-120 seconds at temperatures of 1000° C.-1200° C. Microwave plasma treatments may be conducted using any suitable gas, such as for example, argon, helium, neon, hydrogen, nitrogen, carbon dioxide, carbon monoxide, oxygen, or mixtures thereof. Plasma treatment may be conducted for any suitable length of time, such as for example, less than 1 hour, preferably less than 10 minutes, less than 1 minute, or less than 10 seconds.

Light polycyclic carbons may have a high degree of chemical purity, depending on the purity of feed from which the nanocarbon material has been derived. High purity feeds correspond to a chemical purity of, for example, less than 0.1% heteroatoms. For an associated petroleum gas feed, a chemical purity of 2%-5%, or less, heteroatom compounds may be expected. For typical natural gas feed, a chemical purity of 0.5%-2%, or less, heteroatom compounds can be expected. For a pipeline quality natural gas, a chemical purity of 0.1%-0.5%, or less, heteroatom compounds can be expected.

Separated polycyclic carbons are devoid of solid carbons, metals, or asphaltenes, and have low, if any, phenolic, sulfuric, or azote compound contents. Thus separated polycyclic carbons may serve as a premium feedstock for high-value solid carbon and graphite materials, production of which requires high physical and chemical feedstock purity, including amorphous coke, sponge coke, honeycomb coke, shot coke, needle coke, battery carbons, mesocarbon microbead (MCMB), isotropic pitch, mesophase pitch, activated carbon, carbon fiber, battery-grade graphite, anode graphite, synthetic graphite, nuclear graphite, and electrode graphite.

In some embodiments, the light polycyclic carbons may attach to the nanocarbon materials, and serve as an intrinsic binder. In some embodiments, where the nanocarbons material has been pelletized, the pellets may be calcined using heat treatment, non-thermal treatment or microwave plasma. Suitable heat treatments include, for example, electrically induced heating. Heat treatment may be conducted at any suitable temperature, such as for example, greater than 300° C., greater than 650° C., or greater than 850° C. Heat treatment may be conducted during any suitable time period, such as, for example, greater than 10 seconds, greater than 1 minute, more preferably greater than 10 minutes, or greater than 1 hour. Microwave plasma treatments may be conducted using any suitable gas, such as for example, argon, helium, neon, hydrogen, nitrogen, carbon dioxide, carbon monoxide, oxygen, or mixtures thereof. Plasma treatment may be conducted for any suitable length of time, such as for example, less than 1 hour, preferably less than 10 minutes, less than 1 minute, or less than 10 seconds. Pellet calcining may increase the carbon:hydrogen atomic ratio, and may result in a ratio of greater than 6:1, greater than 20:1, greater than 60:1, or greater than 120:1.

The nanocarbon material may be activated by at least one of heat, steam or carbon dioxide plasma. In some embodiments, pelletized or loose nanocarbon material may be activated with steam. This activation may occur at any suitable temperature, such as, for example, from 700° C. to 1100° C., from 850° C. to 1050° C., from 900° C. to 1000° C., or from 850° C. to 1000° C. This activation may occur, for example, during formation or post-process of the nanocarbon material, or a combination thereof. In some embodiments, pelletized or loose carbon may be activated with microwave plasma. Microwave plasma may contain carbon dioxide in any suitable amount, such as for example, greater than 5%, greater than 20%, greater than 50%, or greater than 90%. Depending on the severity and duration of the thermal or microwave plasma treatment, the activated nanocarbon material surface area may be, for example, 50-100 m^2/g, 100-200 m^2/g, 200-400 m^2/g, 400-800 m^2, 800-1500 m^2, or >1500 m^2.

The nanocarbon material is hydrophobic, and therefore does not form stable dispersions in aqueous media. However, there are certain applications of this nanocarbon material, which may require its dispersion in aqueous media, for example, use as an additive to a cementitious material such as for example cement, concrete, or mortar; paints, dyes, and coatings; conductive inks; or water-based polyurethanes, and others. For use in such applications, a stable dispersion of the nanocarbon material in aqueous media may be achieved through functionalization using for example, oleum, nitric acid, ozone, potassium permanganate; diazonium salts. A stable dispersion in aqueous media can also be achieved through use of a dispersion aid that can cause surface functionalization or micellization of the nanocarbon material. Suitable aids include, for example, naphthalene sulfonate, polycarboxylate ether, or polymer based plasticizers and surfactants. In one embodiment of the process, from 0.001 g to 0.01 g, from 0.01 g to 0.1 g, from 0.1 g to 1 g, or from 1 g to 5 g of carbon powder can be suspended in water in amounts ranging from 0.01 liters to 0.1 liters, from 0.1 liters to 1 liter, from 1 liters to 10 liters, or from 10 liters to 100 liters, in the presence of a dispersion aid. The ratio of dispersion aid to the nanocarbon material may range from 0.1 to 1, from 1 to 2, or from 2 to 10. The nanocarbon material may be added to a solvent media in small increments, under continuous mixing, with the aid of an ultrasonic or high-shear mixer, to prevent coalescence of the nanocarbon material on or in the liquid, as well as along the walls of the dispersion vessel. An evaporation aid, such as for example a rotary evaporator, may be used to cause evaporation of the solvent, thereby increasing the concentration of the solution.

The graphene nanostructures and carbon material in the nanocarbon material are preferably co-formed, achieving a unique nanocarbon form that cannot be achieved by simply blending a graphene with a carbon material. The nanocarbon material may be made by any suitable method. In some embodiments, the nanocarbon material is made according to the methods of US 2019/0047865, which is herein incorporated by reference. In some embodiments, the nanocarbon material may be made by plasma-driven conversion, of pure natural gas feedstock, resulting in a nanocarbon material having an intrinsically high chemical purity.

When making the nanocarbon material, carbon purity, carbon:hydrogen atomic ratio, and concentration of graphenic and graphitic carbons, can be increased by choosing feedstocks from among methane, ethane, propane, butane, and other C1-05 hydrocarbons, and mixtures thereof. Carbon:hydrogen ratio can be increased, for example by post-process heat treatment, non-thermal treatment, or microwave plasma treatment. The post-process heat treatment may conducted, for example, at temperatures of greater than 300° C., greater than 650° C., or greater than 850° C. The microwave plasma treatment can be conducted using plasma gases such as, for example, argon, helium, neon, hydrogen, nitrogen, carbon dioxide, carbon monoxide, oxygen, or a combination thereof.

The concentration of graphenic carbons in the nanocarbon material, which may be estimated via the examination of carbons by transmission electron microscopy, may be increased by reducing the concentration of hydrocarbons in the feed gas during formation. For example, the feed gas hydrocarbon concentrations may be less than 50%, less than 10%, or less than 1%, based on the total feed amount. The concentration of graphenic carbons in the nanocarbon material may be increased by co-feeding carbon dioxide. For example, the carbon dioxide may co-fed in an amount of greater than 5%, greater than 50%, or greater than 90%, based on the total feed amount. In some embodiments, the highest (approximately 20%-50%) graphenic carbon concentration may be observed when the nanocarbon material is derived from a feed gas with a hydrocarbon concentration of less than 1%. In some embodiments, a graphenic carbon concentration of 5-25% may be achieved when the nanocarbon material is derived from a feed gas having a hydrocarbon concentration of less than 10%. In some embodiments, a graphenic carbon concentration of 1%-5% or less may be observed, when the nanocarbon material is derived from feed gas having a hydrocarbon concentration of 10%-50% or higher. In some embodiments, a graphenic carbon concentration of 25-60% may be observed when the nanocarbon material is derived from a feed gas having a carbon dioxide concentration of greater than 90%. In some embodiments, a graphenic carbon concentration of 10%-30% may be observed when the nanocarbon material is derived from a feed gas having a carbon dioxide concentration of 50%-95%. In some embodiments, a graphenic carbon concentration of 2.5%-10% may be observed when the nanocarbon material is derived from a feed gas having a carbon dioxide concentration of 10%-60%.

The concentration of amorphous carbons in the nanocarbon material can be decreased, by changing the concentration of hydrogen in the feed gas. For example, in some embodiments, an amorphous carbon concentration of greater than 50% may be observed when the nanocarbon material is derived from a feed gas having a hydrogen concentration of less than 10%. In some embodiments, an amorphous carbon concentration of 30%-50% may be observed when the nanocarbon material is derived from a feed gas having a hydrogen concentration of 10-50% In some embodiments, an amorphous carbon concentration of less than 10% may be observed when the nanocarbon material is derived from a feed gas having a hydrogen concentration of 10%-60%.

EXAMPLE 5 grams of nanocarbon material (~60 mesh) is physically mixed with 2 grams of a naphthalene sulfonate based surfactant (Fritz-Pak Supercizer 5), creating a mixture that contains ~40% of surfactant, based on the total mass of nanocarbon material to be dispersed. The as formed mixture is dispersed in 1 liter of distilled water, by dispensing the mixture from a glass beaker, in increments of 1 gram mixture, into the container of distilled water. After the addition of each gram of mixture, the solution is first agitated for over 10 minutes, using a magnetic stir plate set to 500 RPM, and then sonicated for an additional 10 minutes, using an ultra sonicator at 46 kHz, until the carbon-dispersant mixture seems homogeneous. Additional cycles of stirred agitation and sonication may be needed in some circumstances, as higher concentrations of the solution are reached. The extent of dispersion is qualitatively assessed by passing the solution through a 602 h grade Whatman filter paper (~1 um pore), with the help of vacuum filtration. At this point, evaporating out the aqueous solvent using either a heated stir plate or rotary evaporator further increases the concentration of the dispersion. A stable aqueous dispersion of concentrations up to 20 g/liter is achieved using this method.

The dispersion in aqueous media is then added directly to the water used in a concrete formulation containing from 7% to 15% cement or cementitious materials, such as fly ash, fused silica, slag cement or natural pozzolans; 60%-80% aggregates, such as sand, gravel, stone, slag, recycled concrete, and other inert, durable materials; up to 8% air; and from 14% to 21% water. The aqueous dispersion of nanocarbon is added to the formulation so that the proportion of nanocarbon to cement is in the following ranges from 0.01% to 0.1%, from 0.1% to 0.2%, from 0.2% to 0.5%, from 0.5% to 1%, from 1% to 2%, from 2% to 5%, from 5% to 10%, or from 10% to 20%.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The terms "about" and "approximately," when used in connection with a numeric value, are intended to include values that are close to, but not exactly, the number. For example, in some embodiments, the term "approximately" may include values that are within +/−10 percent of the value.

What is claimed is:

1. A nanocarbon material comprising:
   a plurality of agglomerate nanostructures comprising a plurality of aggregates of:
      graphene nanostructures having an at least partially crumpled morphology, and clusters of at least one carbon material;
   wherein at least a portion of the carbon material has a graphitic structure; and
   wherein at least a portion of the graphitic structure is at least partially hollow and has at least one winged protrusion.

2. The nanocarbon material according to claim 1, wherein at least a portion of the carbon material has an amorphous structure.

3. The nanocarbon material according to claim 1, wherein the carbon material has at least one morphology selected from the group consisting of capsules, spherules, onion-like particles, rosette-type particles or a combination thereof.

4. The nanocarbon material according to claim 1, wherein the carbon material does not have a nanotube morphology.

5. The nanocarbon material according to claim 1, wherein the carbon material comprises capsules, and the capsules are at least partially hollow.

6. The nanocarbon material according to claim 1, wherein the carbon material comprises spherules and the spherules are at least partially hollow.

7. The nanocarbon material according to claim 1, wherein the carbon material comprises spherules and the spherules are amorphous.

8. The nanocarbon material according to claim 1, wherein the graphene nanostructures have a surface area of from about 100 $m^2/g$ to about 1500 $m^2/g$.

9. The nanocarbon material according to claim 1, wherein the graphene nanostructures have a lateral dimension of from 20 nm to 500 nm.

10. The nanocarbon material of claim 1, wherein the aggregates have an average size of from 100 nm to 1000 nm.

11. The nanocarbon material of claim 1, wherein the nanocarbon material comprises substantially no ash, metal atoms, or heteroatoms.

12. The nanocarbon material of claim 1, wherein the nanocarbon material is surface-functionalized during formation, post-processing, or a combination thereof.

13. The nanocarbon material of claim 1, wherein the nanocarbon material is functionalized to express alkyl, substituted alkyl, phenyl, aryl, substituted phenyl, substituted aryl, hydroxyl, carboxyl, carbonyl, halo, ether, azo, substituted azo, and sulfo moieties, or a combinations thereof.

14. The nanocarbon material of claim 1, wherein the nanocarbon material is in the form of a powder.

15. The nanocarbon material of claim 1, wherein the nanocarbon material is in the form of pellets.

16. The nanomaterial of claim 1, wherein the nanocarbon material has been activated with at least one of heat, steam or CO2 plasma.

17. The nanocarbon material of claim 1, further comprising at least one light polycyclic compound having a carbon atomic count of no more than 100.

18. The nanocarbon material of claim 17, wherein the at least one light polycyclic compound is suitable for production of at least one of amorphous coke, sponge coke, honeycomb coke, needle coke, battery carbons, isotropic pitch, mesophase pitch, mesocarbon microbeads (MCMB), carbon fiber, activated carbon, battery-grade graphite, anode graphite, synthetic graphite, nuclear graphite, or electrode graphite.

19. The nanomaterial of claim 1, wherein the nanocarbon material has a carbon: hydrogen atomic ratio of at least 60.

20. The nanomaterial of claim 1, wherein the nanocarbon material has a bulk conductivity of at least 20,000 S/m, when measured at 1 kN compression force.

21. A composition comprising:
   the nanocarbon material of claim 1; and
   a dispersion medium or a cementitious material.

22. The composition of claim 21, wherein:
   the dispersion medium is selected from the group consisting of an aqueous solution, a solvent, an oil, an alcohol, a matrix, a coating, a paint, or an ink; and
   the nanocarbon material is dispersed in the dispersion medium.

23. The composition of claim 21 wherein:
   the dispersion medium comprises a matrix; and the composition is a composite.

24. The composition of claim 23, wherein the matrix comprises a polymer, ceramic or metal.

25. The composition of claim 21, wherein the composition is suitable for use in at least one of a concrete, mortar, cement, metal, polymer, plastic, rubber, sealant, wax, aerogel, foam, coating, sorbent, catalyst support, epoxy, resin, carbon, asphalt, sealant, adhesive, polymer, battery, fuel cell, supercapacitor, ink, coating, or thermal insulator.

26. The composition of claim 23, wherein the matrix comprises a polymer that is selected from the group consisting of a thermoset, thermoplastic, resin, urethane, or rubber.

27. The composition of claim 23, wherein the matrix comprises a titanium metal.

28. The composition of claim 23, wherein the matrix comprises a polymer that is selected from the group consisting of a polystyrene, polyacrylate, polyolefin, functionalized polyolefin, polyester, polyurethane, polyether, polysiloxane, and combinations thereof.

29. The composition of claim 23, wherein the matrix comprises one or more functionalized polyolefins selected from the group consisting of poly(vinyl chloride), poly(vinyl acetate), poly(vinyl alcohol), and polyacrylonitrile.

30. The composition of claim 23, wherein the agglomerate nanostructures are present in an amount of from about 0.01 weight % to about 10 weight % in the composition.

31. The composition of claim 21, wherein the composition comprises a cementitious material that is selected from the group consisting of a cement, concrete and mortar.

32. A method of making a cementitious composition, the method comprising the steps of:
(i) providing the nanocarbon material of claim 1, and a cementitious material;
(ii) adding the nanocarbon material to an aqueous media, creating a dispersion;
(ii) stabilizing the dispersion; and
(iii) adding the dispersion to the cementitious material;
wherein the dispersion is stabilized by either:
(a) functionalizing the nanocarbon material prior to adding the nanocarbon material to the aqueous medium, or
(b) adding a dispersion aid to the dispersion.

33. The method of claim 32, wherein the dispersion is stabilized by functionalizing the nanocarbon material prior to adding the nanocarbon material to the aqueous medium; and the functionalizing uses a salt selected from the group consisting of an oleum, nitric acid, ozone, potassium permanganate or diazonium salt, or a combination thereof.

34. The method of claim 32, wherein the dispersion aid is selected from the group consisting of a naphthalene, sulfonate, polycarboxylate ether, polymer-based plasticizer, surfactant, or a combination thereof.

35. The method composition of claim 32, wherein the agglomerate nanostructures are present in an amount of from about 0.01 weight % to about 10 weight % in the composition.

* * * * *